United States Patent [19]

Gonzalez et al.

[11] Patent Number: 4,817,166
[45] Date of Patent: Mar. 28, 1989

[54] APPARATUS FOR READING A LICENSE PLATE

[75] Inventors: Rafael C. Gonzalez; Juan A. Herrera, Both of Knoxville, Tenn.

[73] Assignee: Perceptics Corporation, Knoxville, Tenn.

[21] Appl. No.: 859,639

[22] Filed: May 5, 1986

[51] Int. Cl.[4] .............................................. G06K 9/00
[52] U.S. Cl. ......................................... 382/1; 382/22; 382/48; 382/57; 382/60
[58] Field of Search ...................... 382/1, 9, 21, 22, 31, 382/34, 51, 60, 57, 48; 340/51; 356/71; 364/478

[56] References Cited

U.S. PATENT DOCUMENTS

| | | | |
|---|---|---|---|
| 3,550,084 | 12/1970 | Bigelow et al. | 382/31 |
| 3,725,862 | 4/1973 | Roberts | 340/146.3 H |
| 3,818,445 | 6/1974 | Neville | 340/146.3 H |
| 3,846,753 | 11/1974 | Spanjersberg | 340/146.3 D |
| 4,034,341 | 7/1977 | Isono | 340/146.3 H |
| 4,097,847 | 6/1978 | Forsen et al. | 382/22 |
| 4,173,015 | 10/1979 | Owens | 340/146.3 H |
| 4,180,799 | 12/1979 | Smith | 340/146.3 AC |
| 4,180,800 | 12/1979 | Isshaiki et al. | 340/146.3 SY |
| 4,251,799 | 2/1981 | Jib | 340/146.3 H |
| 4,368,979 | 1/1983 | Ruell | 356/71 |
| 4,403,340 | 9/1983 | Kumpf et al. | 382/48 |
| 4,468,703 | 8/1984 | Fujiwara et al. | 382/51 |
| 4,484,348 | 11/1984 | Shizuno | 382/48 |
| 4,491,923 | 1/1985 | Look | 364/478 |
| 4,504,969 | 3/1985 | Suzuki et al. | 382/10 |
| 4,513,442 | 4/1985 | Scherl | 382/49 |
| 4,516,265 | 5/1985 | Kizu et al. | 382/48 |
| 4,523,330 | 6/1985 | Cain | 382/7 |
| 4,524,453 | 6/1985 | Egami et al. | 382/1 |
| 4,528,692 | 7/1985 | Umeda et al. | 382/9 |
| 4,553,260 | 11/1985 | Belt et al. | 382/22 |
| 4,567,609 | 1/1986 | Metcalf | 382/9 |
| 4,603,390 | 7/1986 | Mehdipour et al. | 364/467 |
| 4,695,884 | 9/1987 | Anastassiou et al. | 382/51 |

Primary Examiner—Leo H. Boudreau
Attorney, Agent, or Firm—Luedeka, Hodges & Neely

[57] ABSTRACT

A video camera produces an image of a license plate on a vehicle, and a scanning apparatus finds a license plate number in the image. The identification of the license plate number is verified in a confidence check section by checking for the presence of a state logo. Next, a character extractor identifies individual characters of the number by finding and tracing a contour along interior portions of the character edges, and the contour length, character height, and character width are then checked in a validity checking section to determine whether they are within predetermined acceptable ranges. To correct for obscuring objects on the license plate, a character alignment section determines the top line and baseline of the license plate number and disregards portions of the characters that appear to be outside of these limits, and a license plate frame correction section is utilized to extract the characters when a portion thereof is obscured by a license plate frame. Once extracted, the characters are recognized by a structural analysis section and a state recognition section recognizes the state logo. Once the state is identified, a verification section rereads the license plate number utilizing knowledge of the type style used by the identified state.

31 Claims, 4 Drawing Sheets

APPARATUS FOR READING A LICENSE PLATE

FIELD OF INVENTION

The present invention relates to an apparatus and method for reading a license plate and particularly relates to an apparatus and method for reading a license plate in which a license plate image is identified and verified using sets of predetermined criteria and then the license plate number and state logo are analyzed to read the number and identify the state.

BACKGROUND AND SUMMARY OF INVENTION

In most states, provinces and countries (collectively referred to herein as "states"), vehicles carry a license plate bearing an alphanumeric identification code which is commonly referred to as a license plate number and is also referred to herein as a license plate character set. Since each vehicle is uniquely identified by this number, it is widely used by law enforcement agencies and private concerns to identify vehicles and the license plate numbers are often stored in large data bases so that the identify associated with a particular number can be rapidly obtained. With the growing use of license plate numbers, a need has developed for a method or means for automatically reading a license plate. As used herein, the concept of reading a license plate is used in a broad sense and includes locating, recognizing and identifying the license plate. Preferably, the reading of a license plate would include converting the license plate number and state name into a digital form for being input into a computer.

An automatic license plate reader is useful for monitoring vehicles that are crossing international borders, or, for example, it is convenient to have an automated license plate reader to monitor vehicles entering and leaving a parking lot. Such a license plate reader should be able to read the license plate number and state name and supply them to a computer as meaningful data. In this manner, the necessity of having a human interface to read the license plate is eliminated, and large numbers of license plate numbers and state names may be quickly and easily entered into a computer.

The present invention is a license plate reader in which a license plate number is read, preferably converted into a digital form, and fed to a computer for further processing. In reading a license plate, there are a set of problems peculiar to the environment of the license plate that makes it difficult to read. For example, a license plate may be difficult to read because a frame touches or partially obscures part of the license plate number or state logo, and the type style of the characters on the license plate may vary according to the state of the license plate. (As used herein, the term "state" will refer to any entity that issues license plates). Thus, a license plate reader such as the present invention must adjust for frames and differing type styles. Another common environmental problem of a license plate reader is a crooked license plate. Because a license plate may be crooked on the vehicle on which it is carried, the license plate reader may not assume and must determine the orientation of the characters or at least accommodate for crooked character lines. The license plate also could be obscured by dirt and license plates are made in a wide variety of colors with both dark and light backgrounds. These factors also make a license plate difficult to read. In short, there are numerous environmental problems unique to license plates which the present invention recognizes and overcomes.

In accordance with one aspect of the present invention, an apparatus for reading a license plate that is mounted on a vehicle includes an imaging system, such as a video camera system, for producing an image including the area of the license plate. A processing apparatus scans the image and a block of the image is located which meets a first criteria indicating that the block may be a license plate. The block is then compared by the processing apparatus to a second criteria and a decision is made as to whether the block is a license plate. In the preferred embodiment, the first criteria is a measure of intensity transitions that meet a predetermined frequency of occurrence criteria. Assuming a block is determined to be a license plate by the first and second criteria, a confidence check section in the preferred embodiment checks this decision by scanning predetermined locations above and below the license plate number to check for the presence of a state logo. If the logo is detected, the presence of a license plate number has been verified.

In accordance with another aspect of the present invention, an extractor finds the characters of a license plate number by first classifying the background as either light or dark and then finding the edges of the characters by looking at the gradient of the image intensities as the license plate is scanned. Along the edge of the characters, the intensity of the image will rapidly change from one level to the other. For example, in the case of a light background, a character edge will cause the intensity level to drop rapidly, and thus the gradient will identify the edge of the character. Once the edges of characters are located, the interior portions of the edges are determined using the Laplacian operator. For example, in the case of a light background, the Laplacian operator will identify that portion of the edge that is darkest. A threshold selection is then made in which a threshold level is determined based on the interior edge of the character. In the case of a light background, the threshold selected is the intensity level most frequently found along the interior portion of the edges of the characters. Then, using the interior portion of the edge or the threshold level, the contours of the characters are traced.

A validity checking section, which is part of the extractor, checks the contours to insure that they are valid. Since the approximate size of the character on a license plate is known, criteria are established for the contour length, character height, and character width. The validity checking section will compare the contour length, character height, and character width to these criteria to insure that each of these parameters is within a selected range. If a contour violates these criteria, it is flagged for additional analysis.

Another part of the extractor, a character alignment section, analyzes the characters of the license plate number to verify that the characters are aligned. In the character alignment section, a baseline and a top line of characters are first determined. Portions of characters lying outside of the baseline and top line are disregarded. Also, a correction section of the extractor analyzes the characters to compensate for the possibility of a license plate frame partially obscuring the characters and will extract the characters even though partially obscured by a frame.

Once the characters are extracted, a character recognition section recognizes the characters by a structural analysis that considers convex hulls, bays and holes in the characters and analyzes the number, position and shapes of these parameters to identify each character. After the characters are recognized, the state logo is located and read and the state is identified by a state identification section, and a verification section reanalyzes the characters utilizing knowledge of the type style used by the identified state to verify that the number has been properly and accurately read.

BRIEF DESCRIPTION OF THE DRAWINGS

The present invention may be best understood by reference to the following Detailed Description of a preferred embodiment when considered in conjunction with the Drawings in which.

DETAILED DESCRIPTION

Figure 1:
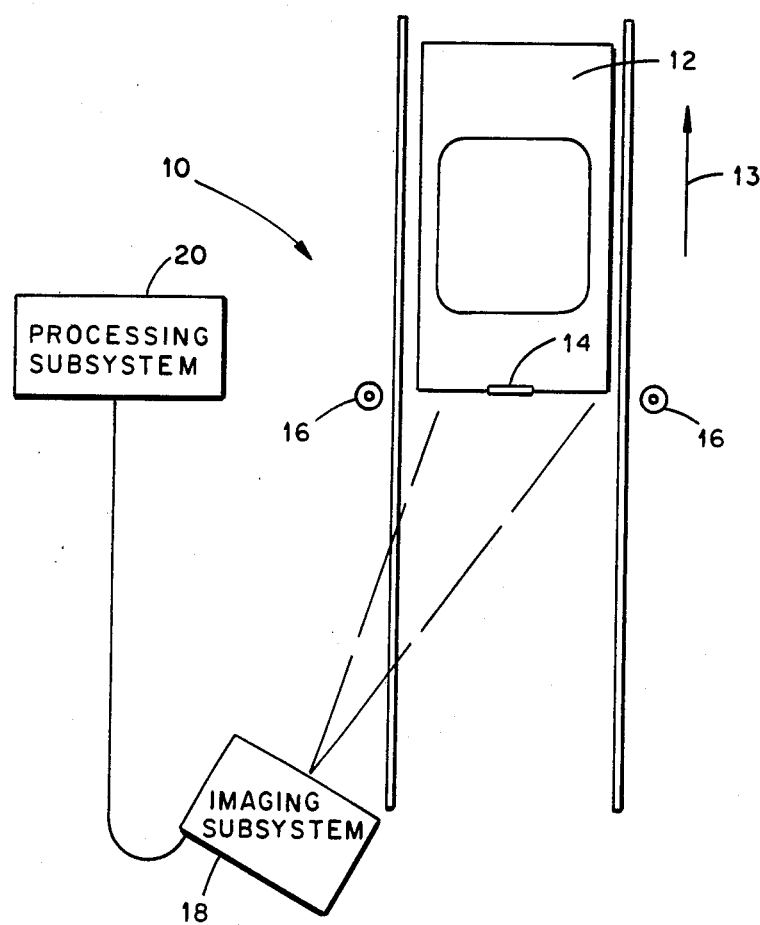
FIG. 1 is a schematic plan diagram of the license plate reader in the process of reading a license plate on a vehicle.

Referring now to the drawings in which like reference characters designate like or corresponding parts throughout the several views, there is shown in FIG. 1 a schematic plan overview of the license plate reader 10. A vehicle 12 is shown traveling in the direction indicated by arrow 13 with a license plate 14 affixed to the center rear portion of the vehicle 12. Vehicle sensors 16 detect the presence and then the absence of a vehicle, and activate the imaging subsystem 18 to view the rear of vehicle 12 and produce an image thereof. The image of the vehicle 12 and the license plate 14 are fed from the imaging subsystem 18 to a processing subsystem 20 which locates and reads the license plate.

Figure 2:
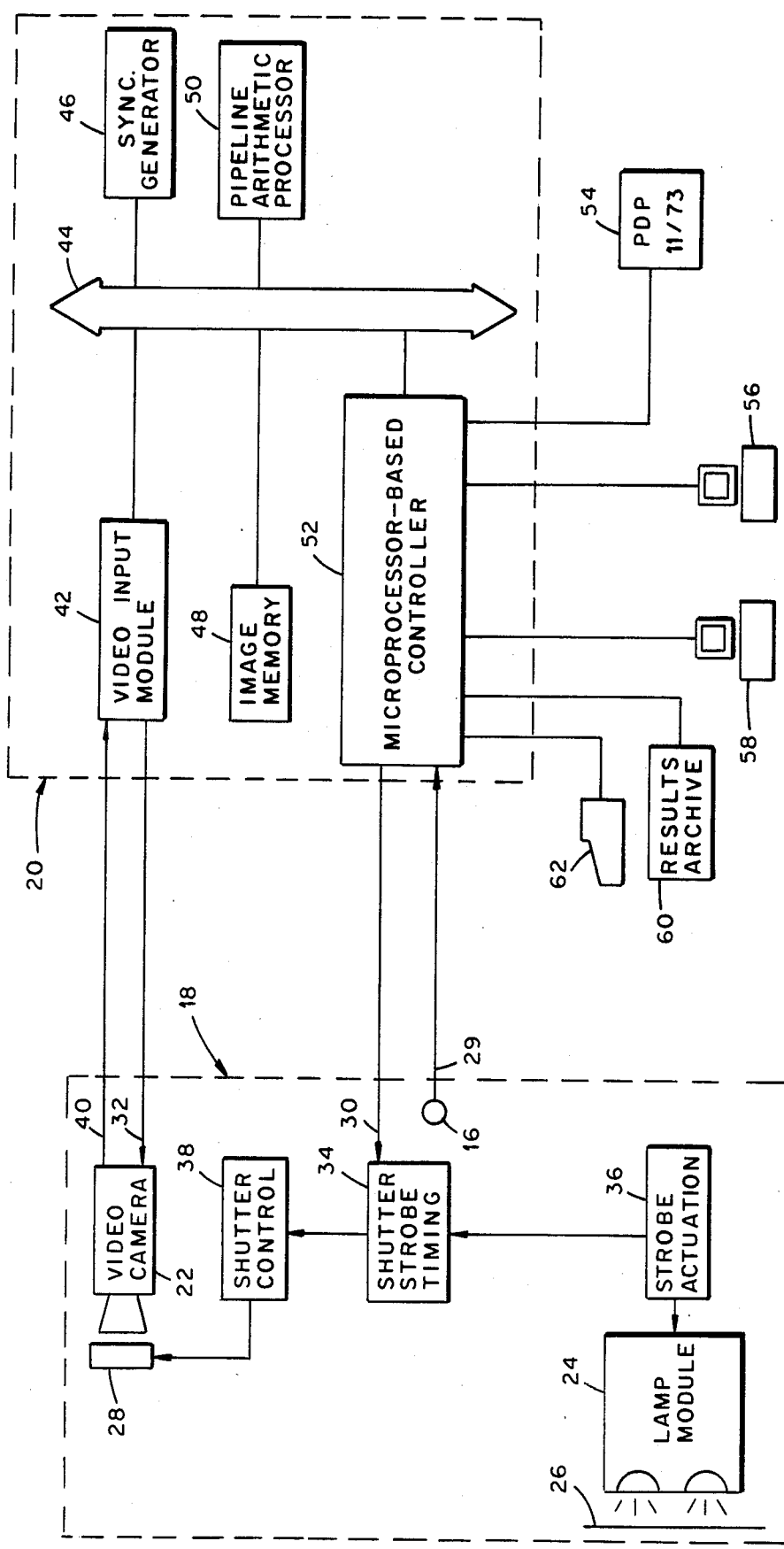
FIG. 2 is a schematic diagram of the license plate reader showing the imaging system and the apparatus for processing the image to determine the license plate number.

Referring now to FIG. 2, the imaging subsystem 18 and the processing subsystem 20 are shown in greater detail. The subsystem 18 includes a video camera 22 that is focused on the license plate 14 as shown in FIG. 1, and the subsystem includes a lamp module 24 that illuminates the license plate 14 through a polarizer 26. The video camera 22 includes an electronic shutter 28 that is polarized when opened, and the open shutter 28 is cross-polarized with respect to polarizer 26.

To initiate the imaging process, subsystem 18 is actuated by signals appearing on lines 30 and 32, both from the processing subsystem 20. Referring to FIGS. 1 and 2, when the sensor 16 detects the presence, then the absence, of a vehicle 12, the rear of the vehicle is properly positioned and an actuation signal is produced on line 30. The signal on line 30 is received by a shutter/strobe timing circuit 34 which applies a signal to a strobe actuation circuit 36 and a shutter control circuit 38. The actuation circuit 36 actuates the lamp module 24 and causes it to flash. At the same time, or very shortly thereafter, the shutter control 38 opens and closes the electronic shutter 28 for a duration of about 1/10,000 sec. during the period of the flash from the lamp module 24. An initialization signal appearing on line 32 is provided to the video camera 22 by the processing subsystem 20 which causes it to begin scanning a new frame just prior to the flash from lamp module 24 and just prior to the opening of the electronic shutter 28.

The image that is captured by the video camera 22 is transmitted by line 40 to a video input module 42 of the processing subsystem 20. This image is then transmitted from the module 42 to a data bus 44 which is also connected to a sync generator 46, an image memory 48, a pipe line arithmetic processor 50, and a microprocessor based controller 52. In the preferred embodiment, the image memory 48 is a Perceptics MEM-16 and the micro processor based controller 52 is a Motorola 68010. The controller 52 is also interconnected with an exterior computer 54, such as a PDP 11/73, an operator in/out terminal 56, a maintenance/start-up terminal 58, a results archive 60, and a hard copy printer 62. Once the image of a rear of a vehicle is captured in the image memory 48, it is operated upon by the processor 54 and by the controller 52 to locate the license plate and then read it.

Figure 3:
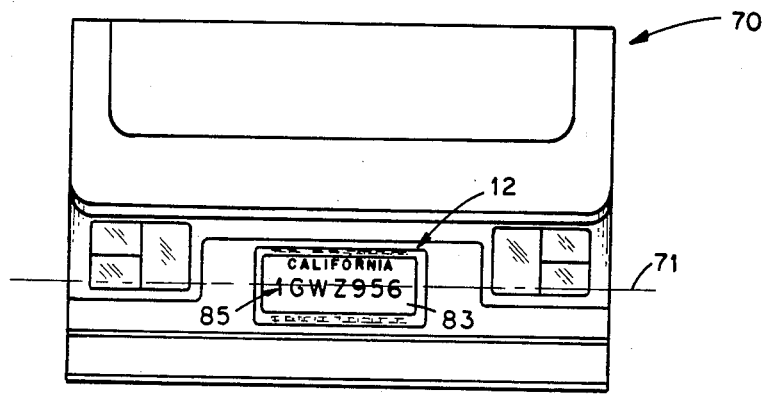
FIG. 3 is an image of the rear of a vehicle in the area of a license plate.
Figure 4:
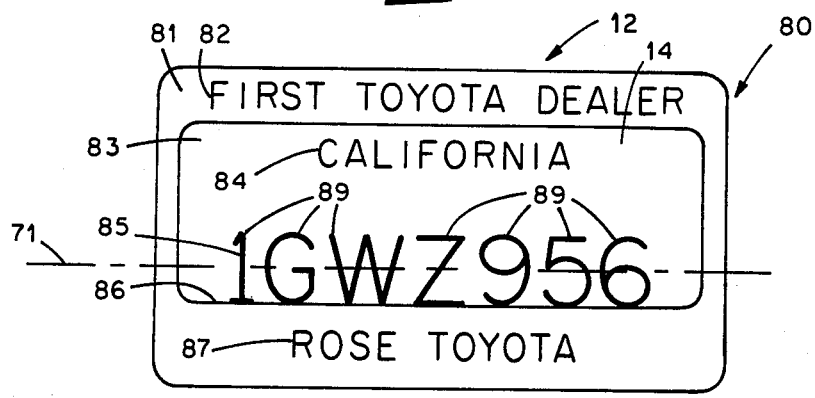
FIG. 4 is an image of a representative license plate.
Figure 5:
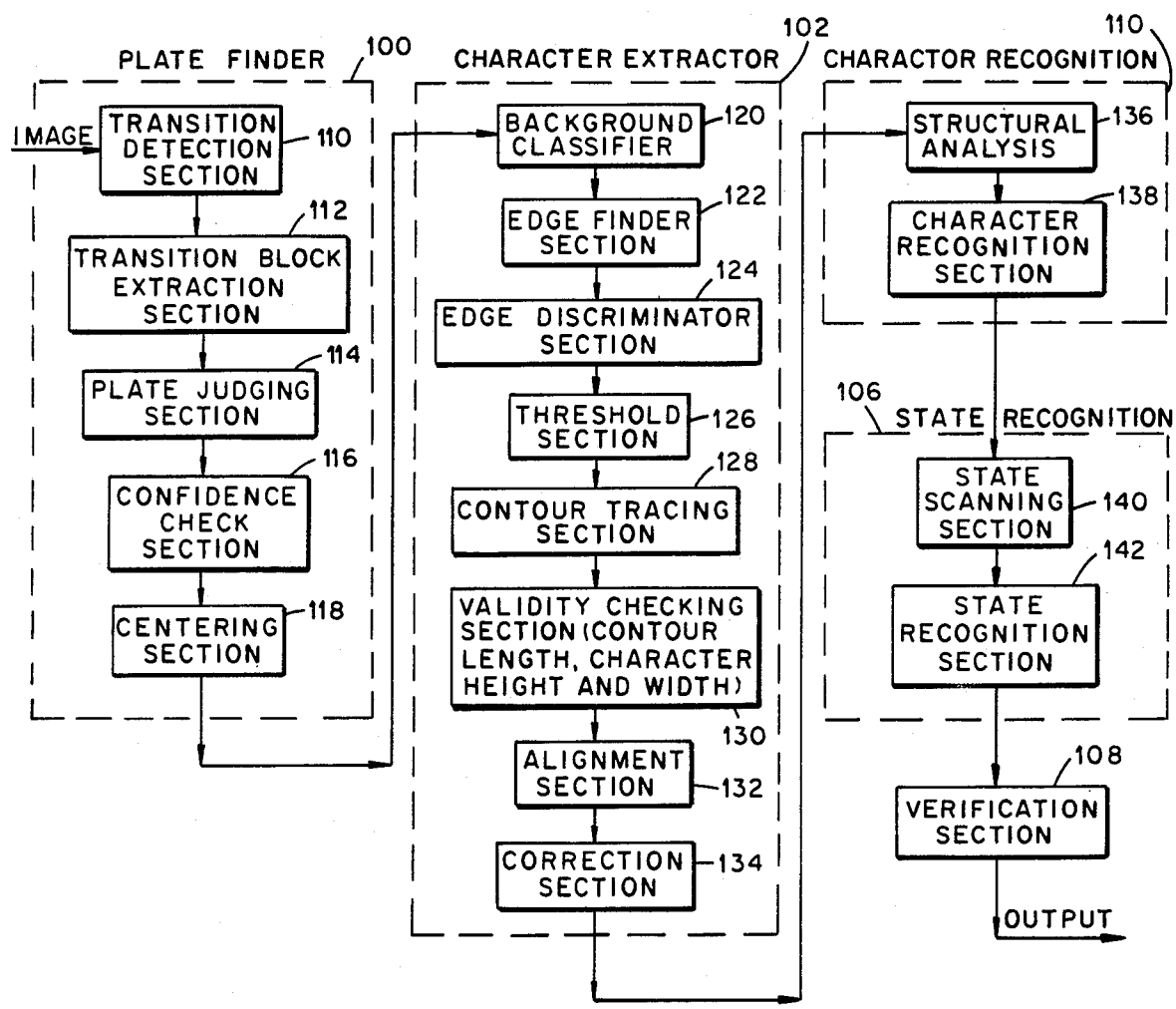
FIG. 5 is a block diagram showing one embodiment of the license plate reader.

The operation of the processor 20 may best be understood by reference to the operational block diagram shown in FIG. 5 when considered in conjunction with FIG. 3, an image of the rear of a vehicle, and FIG. 4, an image of a license plate. Referring to FIG. 5, the license plate reader includes a plate finder section 100 which operates on the image 70 such as that shown in FIG. 3 to find the license plate 12. When the license plate 12 is located, this information is transferred to the character extractor section 102 which finds the characters 89 (FIG. 4) and the contours thereof. Each character 89 is then recognized by the character recognition section 104 and afterwards the state or country is determined by a state recognition section 106. The final operation is performed by the verification section 108 which utilizes information about the peculiar characteristics of each state's license plates to reread and verify that the license plate characters 89 have been correctly identified.

The plate finder 100 includes a transition detection section 110 that looks for transitions meeting a frequency criteria that would indicate that a license plate number 85 may have been encountered. This technique is best understood by reference to a scan line 71 shown in FIG. 3 crossing a license plate number 85. It will be appreciated that the frequency of intensity transitions on the image 70 occurs more rapidly as the scan line 71 crosses the number 85. That is, the intensity level begins to change rapidly between light and dark as the scan line 71 passes through the license plate number 85 and the scan crosses between the characters 89 and the background 83. The intensity transitions caused by the characters 89 will vary depending upon the size of the characters on different license plates 12, the spacing between the characters, the type of numeral or letter that is used on the license plate 12 and the gray levels of the background 83 and characters 89. Also, the intensity transition frequency will depend upon the angle at which the license plate is viewed by the imaging subsystem 18, and the size of the image of the license plate. The image size of the license plate 14 will depend upon the distance of the license plate 14 from the imaging subsystem 18 and any magnification thereof, either optically or electronically. In the transition detection section 110, a number of criteria could be devised for determining whether the detected intensity transitions corresponding to a license plate number, but in the preferred embodiment, the section 110 looks for a particular size pulse in terms of duration (pixel length) and looks for a minimum number of such pulses within a given window on a scan line. As a scan crosses part of a character 89, a pulse having a length in the range of 4 to 24 pixels is produced and it is assumed that any license plate number 85 will create 6 to 18 such pulses in a scan length (window) of at least 112 pixels. These are the criteria used in the preferred embodiment.

As the transition detection section 110 identifies windows that meet the predetermined frequency criteria, a transition block extension section 112 will extract a block from the image that meets the transition frequency criteria. Assuming that a license plate number 85 is the subject of a scan interrogation, the block identified by the transition block extraction section 112 will have a height equal to the character height of the license number 85 and will have a length equal to the string length of the license plate number 85. The block identified by the extraction section 112 is a block suspected to be a license plate number.

The transition block extraction section 112 selects a block of the image which may correspond to a license plate number 85 by first looking for windows the height of the number 85. To determine the height, the extraction section 112 first begins to move up one line at a time and count the number of lines that meet the intensity transition criteria. Then, section 112 counts down until it hits a line that does not meet the intensity transition criteria. The number of scan lines from the top of the block to the bottom indicates the height. The width or string length of the number 85 is found by averaging the length of three of the windows in three scan lines that meet the transition criteria. Once the block is extracted, plate judging section 114 judges the block to determine whether it is a license plate number 85. A license plate number 85, or an image thereof, will have a particular height and width that falls within a predetermined range. The width of license plate numbers 85 will vary greatly from state to state and even within the state, but the height of the license plate numbers 85 remains relatively constant. By selecting maximum and minimum widths for license plate number 85 and maximum and minimum heights for the license plate number, the plate judging section 112 makes a first determination as to whether the suspected license plate number 85 is in fact a license plate number. In the preferred embodiment, the height of a license plate number 85 is assumed to range between 32 and 60 pixels and its width is assumed to range between 4 and 18 pixels. If a block meets these criteria, it is assumed to be a license plate number 85. It will be understood that the distance between the imaging subsystem 18 and the plate 14 and the optical characteristics are chosen so that a license plate number 85 in the image would fall within the aforementioned ranges. If the optics, the geometry or the expected size of number 85 were changed, the ranges must also change in a corresponding fashion.

A confidence check section 116 double checks the plate judging section by scanning above and below the suspected license plate number 85. This scan is done to check for state logos, such as logo 84 shown in FIG. 4, which will usually appear above or below the license plate number 85 in a predetermined location. By scanning the predetermined locations, the confidence check section is scanning to determine whether or not a logo 84 is properly positioned with respect to the suspected license plate number 85. In the preferred embodiment, the logo 84 is identified by frequency of intensity transition criteria. Since the logo 84 is usually depicted with letters smaller than those of the number 85, it is necessary to use a different criteria of transition frequency then used to locate the number 85. In the preferred embodiment, the confidence check section 116 scans for a selected number of gaps between letters in a predetermined window. That is, the section 116 looks for pulses having an intensity level equal to the background intensity, having a pulse length of 1 to 4 pixels with 7 pulses in 56 pixels. Also, in the preferred embodiment, the confidence check section scans a window that is 56 pixels long that is located from 10 to 18 pixels above the top of the license plate number 85 and from 10 to 18 pixels below the bottom of the license plate number 85. The locations mentioned above are the predetermined locations where the logo 84 is expected and the window is the size range within which a logo 84 must fall. If a suspected logo is larger than the window, it is rejected as a logo.

In FIG. 4, there is shown a license plate image 80 which includes a frame 81 that is positioned over the license plate 12. The words "First Toyota Dealer" are written on the top part of the license plate frame 81 as indicated by the characters 82. In this case, the background 83 of the license plate 14 is light and the state logo 84 is in the form of the word "California". Below the logo 84 is the license plate number 85 which is formed by characters 85 in the form of "1GWZ956". Immediately below the number 85, it will be noted that the lower edge 86 of the frame 81 touches and at least partially obscures the very lower edges of the number 85. Also, below the number 85, written on the license plate frame, are the words "Rose Toyota" identified as words 87. The confidence check section 116 will scan above and below the license plate number 85 shown in FIG. 4. Since the logo 84 will appear in the predetermined location immediately above the number 85, the confidence check section 116 will verify that a license plate number has been located.

In the preferred embodiment, the confidence check section 116 scans a predetermined area located with respect to the number 85 to determine whether certain intensity transition frequencies occur indicating the presence of a state logo. In the license plate 14 shown in FIG. 4, the words "First Toyota Dealer" appear at the top of the license plate frame 81. These words would not be identified as a state logo because the overall width is too long and it would not meet the length criteria of 56 pixels. Also, the words "First Toyota Dealer" are not in a proper vertical position for any state logo.

Likewise, the words "Rose Toyota" which appear immediately below the number 86 would not confuse the confidence check section 116 because the words are too long and because they are not located in an acceptable position. That is, they are not located in the plate where one would normally expect to find a state logo.

Referring again to FIG. 5, after the confidence check section 118, the center of the license plate number 118 is found by the centering section 118. The centering section 118 scans the license plate number 83 horizontally along a plurality of lines and finds the furthest point, or the most outward points on each line. It then averages the furthest points and calculates the center of the license plate number 85 in the horizontal direction. In the preferred embodiment, the centering section 118 scans only three lines, but of course more lines could be scanned.

The first section of the character extractor 102 is a background classifier section 120 that determines whether the background 83 of a license plate is light or dark. The background classifier section 120 looks at a histogram of the intensity levels over a selected area of the image which includes the license plate number 118. This selected area is chosen to be the same size or greater than the size of the number 118, but smaller than the expected size of the license plate 14. Assuming that a dark area has a lower level of intensity than a light area, if the median intensity is less than the average intensity, then the background 83 is light, but if the median intensity level is greater than the average, then the background 83 is dark. Once the background 83 is classified, the edge finder section 122 will find the edge of each character 89 by looking at the gradient as the license plate number 85 is scanned. In other words, as the license plate number 85 is scanned horizontally, when the scan encounters the edge of a character 85, the intensity level will rapidly change from the background 83 intensity level to the character 89 intensity level. Thus, the rapid change in intensity level around the edge of the character 85 will provide a large gradient indicating the presence of an edge. An absolute gradient of greater than 30 gray levels of 256 maximum is presumed to be an edge in the preferred embodiment. The edge discriminator section 124 then uses the Laplacian operator to determine the interior portion of the edge of a character 85 where the interior portion is defined as that portion of the edge that is closest to the main area of the character 85. The edge discriminator section 124 uses the information regarding the background 83. If the background 83 is light, then the interior portion of the edge will be the darker portion of the edge. Likewise, if the background 83 is dark, then the interior portion of the edge will be the lightest portion of the edge. The interior portion of the edge is defined as having a Laplacian that is positive if the background is dark and negative if the background is light. The threshold selection section 126 then chooses a threshold which is equal to the intensity level that is most frequent in the interior portion of the edge. Thus, the threshold level is the majority gray level of the interior portion of the character edges.

After the threshold is determined, any area within the license plate number 85 that has an intensity level that meets the threshold level will be considered part of the character. Using this information contour tracing section 128 traces the contour of each character. In the preferred embodiment, contour tracing is done by examining a three pixel by three pixel neighborhood of a subject pixel. In order to be a pixel on a contour, at least one of the eight surrounding pixels must be a background point as determined by the threshold intensity level. That is, it must have an intensity level that does not meet the threshold criteria.

The validity checking section 130 then checks on the contour that was traced by section 128. In the case of any license plate, the character sizes that may possibly occur on a license plate are known in advance. These character sizes will vary from state to state, but there is a range within which the size of the characters must fall. In order to insure that the contours are correctly traced by the contour tracing section 128, their validity is checked by measuring the overall length of the contour, the character height, and the character width. These parameters are then compared to a preselected range corresponding to each such parameters. If the contour length, character height and character width fall within the range of acceptable dimensions, then it is assumed that the contour was correctly traced by section 128. However, if any of these factors appear to be in error, the character is flagged for further analysis. In the preferred embdiment, the contour length must be within 30 to 255 pixels; the character width within 4 to 18 pixels; and the character height within 32 to 60 pixels. These ranges can vary depending upon viewing geometry and expected physical size of the license plates.

Figure 6:
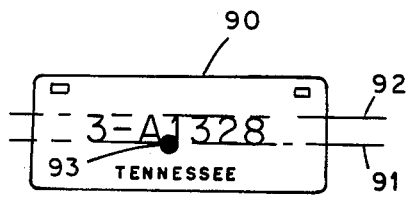
FIG. 6 is a representative image of a license plate showing the top line and baseline of the plate number.

After the validities of the character contours have been checked, a character alignment section 132 analyzes the characters of the license plate number 85 to find a top line and a baseline of the character set or number 85. This top line and baseline are preferably determined by finding the uppermost and lowermost points of each character contour and fitting the best straight lines through such points. Next, measures of how well the top line and baseline fit the uppermost and lowermost points are obtained preferably by using the least square error to compute the accuracy of the line fit. If this measure is not sufficiently small according to predetermined criteria, the contour whose points most perturb the line fit are removed and the top line or baseline is recalculated. The process of removing the points of the most perturbing contour is repeated until a line is obtained that meets the predetermined criteria. The process of removing points and recalculating is done separately for the top line and baseline, and the criteria for determining when the line fit is acceptable is determined by the particular application. In the preferred embodiment a line fit is accepted when the improvement in the least square error is less than 1.5. Once these lines are drawn, any portion of the contour lying outside of the baseline and top line is considered erroneous. For example, in FIG. 6 there is shown a license plate 90 having a license plate number of "3-A1328" in which a baseline 91 and a top line 92 are defined by calculating the best line through the uppermost and lowermost points of the number "3-A1328". In this case, an obstruction 93 is obscuring part of the characters "A" and "1". In order to assist the proper extraction of the characters, that portion of the "A" and "1" which is actually part of the obstruction 93 is ignored or eliminated. That is, the obstruction 93 is disregarded for purposes of character extraction to the extent it is below baseline 91.

Figure 7:
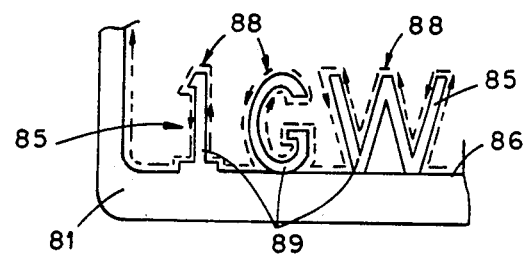
FIG. 7 is a partial view of a license plate image showing a character contour tracing attempt that is defeated by a license plate frame.

In order to correct for errors caused by license plate frames or similar obstruction problems, a correction section 134 detects the presence of an interfering license plate frame or the like and extracts the contours of the characters 89 in spite of the frame 81. A license plate frame, such as frame 81 shown in FIG. 6, will interfere with the operation of tracing the contours of the characters when the frame 81 partially obscures the license plate number 85. In FIG. 7, the dashed line 88 shows an attempt to trace the contours of each character 85 of the number 85, and it will be appreciated that the attempt to trace the contour has produced a runaway contour because of the frame 81. When this runaway occurs, and the contour tracing operation does not extract a valid contour, the correction section 134 retraces the contours beginning at the center of the number 85. As the contour is traced, it is still a runaway contour, but the section 134 records local maxima and minima positions. When the attempt to trace the contour traces to a position that exceeds the maxima or goes below the minima, it is assumed that a frame has been encountered, and that that portion of the contour that lies outside of the maxima and minima that have been established is considered invalid data. Using the local maxima and minima, a top line and a baseline of the characters is established and the contours of the characters may be accurately retraced and extracted using the acquired knowledge of the tops and bottoms of the characters. In FIG. 7, the baseline would coincide with the upper edge 86 of frame 81 and the top line would be defined by the tops of the characters 89. In order to extract the contours, everything above the maxima and below the minima is assured to be a frame 81 and the values in these positions, for the purposes of extracting the contours, are assumed to be the value of the background 83.

After the characters 89 have been extracted by section 102, the characters 89 are recognized in section 104. The first step of character recognition is performed by the sructural analysis section 136 to determine the shape of the convex hull, the shape, number and position of bays, and the shape, position and number of holes in each character. After these parameters have been determined, the character recognition section 138 performs a structural analysis based on the convex hulls, bays and holes to determine the identity of each character. The structural analysis section 136 and the character recognition section 138 function based on structural character recognition methodology.

In the state recognition section 106, the scanning section 140 first scans the license plate 14 in the area in which the state logo 84 is expected to be found. The logo 84 has been previously located by the confidence check section 116. In scanning the state logo 84, section 140 counts the number of gaps between characters as previously discussed. The scanning section 140 also measures the length of the logo in addition to the number of gaps between characters in the state logo 84. The length of the logo 84 is determined by applying a frequency of intensity transition criteria and finding a window that meets the criteria which in the preferred embodiment is at least 4 pulses in 70 pixels each pulse having a duration of 1 to 5 and having an intensity within two standard deviations of the background intensity level. If the logo 84 meets the frequency of intensity transition criteria and the length criteria, the state recognition section 142 then identifies the state based on the length of the logo 84, the number of gaps between characters in the logo 84, the distance between the license plate characters set and the logo, the position of the logo 84 on the plate 14 and the level of the background (color). This recognition is accomplished by a lookup table in which the color of the background, the distance to the characters, the length, position, and number of gaps of state logos have been entered for each state to be considered. In some instances, it will be difficult or impossible to distinguish between two state logos based solely upon these parameters, and, in such case, a best guess is made based on the area in which the license plate reader is being used. For example, if the reader is being used on the Mexican border, California will be a first choice. That is, if a logo has parameters that would qualify to be either California or another state, the best choice would be California because of the proximity of the state to the Mexican border.

In the preferred embodiment, the processing subsystem 20 learns the characteristics of the state logos and generates its own original database. To learn, the system 20 receives a command to learn and is provided an image of a license plate 14. The predetermined locations are scanned and a logo is found as previously described. Then, the length and location of the logo are stored in a database for a state, country or province identified by the operator. This learning capability of the subsystem 20 allows the addition of new logo data in the field if desired or necessary.

Figure 8:
FIG. 8 is a representative image of a particular type style of the numeral "one" and the letter "I" (eye).

When the state has been recognized, the verification section 108 will reanalyze the license plate number to insure that it has been properly interpreted. The verification section 108 adjusts the recognition of characters on a license plate according to the state of the license plate. Each state may utilize a slightly different type style for the characters on the license plate. For example, the letter "I" (eye) and the numeral "1" (one) could be represented by a vertical slash. Thus, it would be impossible for a license plate reader to distinguish between these two characters unless the particular type style of the state is known. For example, assume a state uses the type style shown in FIG. 8 where character 93 is a numeral "one" and character 95 is a letter "I" (eye). Once this state has been identified, the verification section 108 will reanalyze the recognition of the characters and if character 93 has been identified in a license plate number, it will now be recognized as a "1" (one) whereas it had previously been recognized as an ambiguous character. The verification section 108 will vary according to the application to which the license plate reader is made. For example, if only a small number of states are to be considered by the license plate reader, the verification section 108 would have only a few type styles and a look-up table would be provided for each state specifying the identity of ambiguous numerals or letters. The most prevalent type style is assumed for all operations preceding the operation of verification section 108, but for a particular set of states the ambiguous characters are known and are flagged for further analysis in section 108. After the operation of the verification section 108, the license plate number 85 has been read and reread for accuracy, and the number is now fed to the controlling computer 54 (FIG. 2) along with the state name for further processing.

Although a particular embodiment has been described in the foregoing Detailed Description, it will be understood that the invention is capable of numerous modifications, rearrangements and substitutions without departing from the scope of the invention as defined by the claims. The ranges and various criteria described herein will vary depending upon the particular application and the desired level of accuracy. It is not intended to limit the invention to a particular form, application or set of parameters.

What is claimed is:

1. An apparatus for finding and identifying an image of a license plate of a predetermined class that bears characters and that is mounted on a vehicles, comprising:

means for producing an image that includes the license plate;

means for scanning the image and identifying a block of the image that meets predetermined frequency that is above a selected non-zero threshold, said threshold being selected to correspond to the frequency expected to be produced by scanning across the characters of any license plate of the predetermined class; and decision means for comparing the block to second criteria to determine and indicate whether a block is an image of the license plate characters.

2. The apparatus of claim 1 wherein said decision means comprise:

means for determining the height and width of the block based on the area of the image that meets the predetermined criteria;

comparison means for comparing the height and width of the block to predetermined height and width ranges to decide and indicate whether a block is an image of identifying characters on the license plate.

3. The apparatus of claim 2 further comprising character finding means comprising:

edge finder means for making a first identification of edges of characters within the identified blocks in the image of the license plate, the edges having a range of intensity levels;

edge discriminator means for discriminating between the range of intensity levels of the edges and for selecting and defining a threshold intensity level based on the range of intensity levels of the edges; and contour tracing means for tracing the contours of characters using the threshold intensity level.

4. The apparatus of claim 3 further comprising:

validity check means for measuring the length of said contours; and comparison means for comparing the length of said contours to predetermined length criteria and identifying contours that do not meet the predetermined length criteria.

5. The apparatus of claim 2 further comprising character finding means comprising:

background means for determining a background intensity level of the image that corresponds to the most frequently occurring intensity level in the identified block of the image of the license plate;

edge finder means using a gradient operator for making a first identification of edges of potential characters in the image of the license plate; the edges being defined as areas having an intensity level gradient above a predetermined value and, thus, including a range of edge intensity levels;

edge discriminator means using a Laplacian operator for identifying a selected portion of the edges that have a selected edge intensity level, said selected edge intensity level being within the range of edge intensity levels and being a selected percentage of the range above the background intensity level; and contour tracing means for tracing the contours of potential characters based on the selected portion of the edges.

6. The apparatus of claim 2 further comprising means for recognizing and extracting characters within the identified block of the license plate.

7. The apparatus of claim 6 further comprising:

validity check means for measuring the individual height and width of the characters on the license plate;

comparison means for comparing the height and width of the characters to predetermined height and width criteria and identifying characters that do not meet the predetermined height and width criteria.

8. The apparatus of claim 2 further comprising:

character alignment means for defining a straight baseline and a straight top line based, respectively, on the lowermost and uppermost points of the characters, whereby portions of potential characters may lay outside of the baseline and top line; and said alignment means being operable to eliminate portions of the characters that lie partially outside of the baseline and the top line and to define the baseline and the top line as the edges of the characters where character portions lie outside of the baseline and top line.

9. The apparatus of claim 2 further comprising character recognizing means which comprise:

structure analysis means for analyzing the characters to identify the convex hull, bays and holes of each character; and means for recognizing and identifying the characters based upon the convex hull, bays and holes of a character.

10. An apparatus for finding and identifying an image of a license plate that bears characters and that is mounted on a vehicle, comprising:

means for producing an image that includes the license plate;

means for scanning and image and identifying a block of the image that meet predetermined criteria indicating that the block is possibly an image of the characters of the license plate;

decision means for comparing the block to second criteria to determine and indicate whether the block is an image of the license plate character;

character alignment means for defining a straight baseline and a straight top line based, respectively, on the lowermost and uppermost points of the characters, whereby portions of potential characters may lay outside of the baseline and the top line;

said alignment means being operable to eliminate portions of characters that lie partially outside of the baseline and the top line and to define the baseline and the top line as the edges of the characters where character portions lie outside of the baseline and the top line;

said character alignment means further comprising:

means for identifying the uppermost points and lowermost points on each character;

means for computing a top line that is the best straight line that fits through the uppermost points and for computing a baseline that is the best straight line that fits through the lowermost points;

means for determining a first measure of how well the top line and baseline fit the uppermost and lowermost points, respectively, and comparing said first measure to predetermined criteria of acceptable line fit; and means for repetitively removing the uppermost and lowermost points of the characters, one point at a time, the most perturb the line fit and for recomputing the top line and baseline until said first measure does meet said predetermined criteria of acceptable line fit.

11. An apparatus for detecting and perceiving a license plate that bears identifying characters and may bear the logo of a state, provide or country, comprising:
means for producing an image including the license plate and for producing and storing digital image data corresponding to the image;
means for scanning the image data and identifying blocks of the image containing the identifying characters;
means for determining the contours of the identifying characters within the blocks;
recognition means for recognizing each character by structural analysis of the contours;
logo finding means for scanning the digital image data corresponding to at least one secondary block of the image within at least one selected area positioned relative to the identifying characters and determining whether said secondary block has an intensity pattern that meets predetermined criteria; and
recognition means for recognizing the state logo by analyzing the digital image data corresponding to the secondary block when said secondary block meets the predetermined criteria.

12. An apparatus for finding an image of a license plate that bears identifying characters and the name of a state, province or country in one of a plurality of expected positions on the plate and that is mounted on a vehicle, comprising:
means for producing an image of the license plate and at least a portion of the vehicle on which the license plate is mounted;
means for scanning the image and identifying at least one block of the image that has intensity transitions that meet a predetermined frequency of occurrence criteria and potentially constitutes an image of the identifying characters on the license plate;
means for determining the height and width of the block of the image that meets the predetermined frequency of occurrence criteria;
decision means for comparing the height and width of the block of the image to predetermined height and width ranges to decide and indicate whether the block is an image of identifying characters on a license plate;
second means for scanning the image in at least one selected area located in a position relative to the block, said selected area including at least one position in which a state, province or country name is expected to occur; and
check means for detecting intensity transitions in the selected area of said second scanning means and for determining and indicating whether the intensity transitions meet second predetermined criteria indicating that the name of a state, province or country is within said selected area, whereby a check is performed to assure that a block of the image is an image of identifying characters of a license plate.

13. An apparatus for reading a character set of a license plate that is partially obscured by a license plate frame, comprising:
means for producing an image including the license plate;
means for scanning the image and identifying at least one block of the image that meets predetermined criteria indicating that the block is possibly a license plate character set;
means for determining the presence of a license plate frame that is partially obscuring the character set;
means for locating the obscuring edge of the license plate frame that is disposed over at least part of the character set; and
means for extracting the individual characters from the character set using the obscuring edge of the license plate frame.

14. The apparatus of claim 13 wherein said locating means traces the contours of the characters and uses the local maxima and minima of the contours to define the obscuring edge of the frame.

15. The apparatus of claim 13 wherein said extracting means defines the characters using the obscuring edge of the frame as edges of the characters.

16. In an apparatus for analyzing characters of an image, the improvement comprising:
background means for determining a background intensity level of the image;
edge finder means for making a first identification of edges of characters on the image, the edges having intensity levels different from the background intensity level and having a range of intensity levels;
edge discriminator means for discriminating between the intensity levels of the edges, for locating a selected portion of the edges having an intensity level range that is smaller than and within the range of edge intensity levels and for defining a threshold intensity level based on the intensity level of the selected portion; and
contour tracing means for tracing the contours of potential characters using the threshold intensity level defined by said edge discriminator means.

17. The improvement of claim 16 wherein said background means is operable to determine a background intensity level of the image that corresponds to the intensity level occurring most frequently in a selected portion of the image.

18. The improvement of claim 16 wherein said edge finder means uses a gradient operator for making a first identification of edges of the characters in the image, the edges being defined as areas having an intensity level gradient above a predetermined value.

19. The improvement of claim 16 wherein said edge discriminator means uses a Laplacian operator for identifying interior portions of the edges.

20. In an apparatus for analyzing characters of an image of a license plate; the improvement comprising:
means for tracing the contours of the characters in the image of the license plate; and
validity check means for measuring the length of said contours and comparing the length of said contours to predetermined length criteria to reject contours that are not characters.

21. In an apparatus for analyzing characters of an image, the improvement comprising:
means for locating portions of the image that meet predetermined criteria indicating that the portion may be a character and for determining the contour of the portion;
validity check means for measuring the height and width of the contours on the image; and
comparison means for comparing the height and width of the contours to predetermined height and width criteria and reject contours that do not meet the predetermined height and width criteria whereby contours that are not characters are rejected.

22. In an apparatus for analyzing a line of characters on an image, the improvement comprising:
  character aligning means for producing a top line and a baseline, said baseline being defined by at least a portion of the lowermost positions of each character and said top line being defined by at least a portion of the uppermost positions on each character, whereby a portion of some of said characters may lie outside the baseline and top line; and
  redefining means for redefining the characters to eliminate portions of the characters that lie below the baseline or above the top line.

23. A method for reading a license plate character set made up of individual characters on a license plate on a vehicle comprising:
  producing an image including the license plate;
  scanning the image and identifying at least one block of the image that meets predetermined criteria indicating that the block is possibly a license plate character set, said predetermined criteria being a pattern of intensity changes occurring at a predetermined frequency that is above a selected non-zero threshold, said threshold being selected to correspond to the frequency expected to be produced by scanning across the characters of any license plate of a predetermined class;
  extracting the individual characters from the license plate character set; and
  recognizing and identifying each character of the license plate character set.

24. The method of claim 23 wherein said extracting comprises:
  identifying the edges of the characters of the license plate number; and
  discriminating between the interior portions of the edges and the remainder of the edges, whereby the interior portions of the edges are nearer the character than the remainder; and
  defining the interior portions as the contour of the characters.

25. The method of claim 23 wherein said extracting comprises:
  detecting the presence of a license plate frame that is partially obscuring the license plate character set; and
  disregarding the license plate frame and extracting the characters of the license plate character set.

26. The method of claim 25 wherein said disregarding comprises:
  identifying the edge of the license plate frame adjacent to the license plate character set; and
  defining the edge of the characters based on the adjacent edge of the frame and distinguishing the characters from the license plate frame.

27. The method of claim 23 wherein said step of extracting comprises:
  determining a background intensity level of the image;
  finding the edges of the characters;
  after the steps of determining a background intensity level and finding the edges, setting a threshold intensity level and based on the background intensity level and the intensity levels of the edges; and
  using the threshold intensity level to extract the characters.

28. A method for reading a license plate character set made up of individual characters on a license plate on a vehicle comprising:
  producing an image including the license plate;
  scanning the image and identifying at least one block of the image that meets predetermined criteria indicating that the block is possibly a license plate character set;
  extracting the individual characters from the license plate character set;
  recognizing and identifying each character of the license plate character set; and
  said extracting further comprising determining the baseline and top line of the license plate character set, disregarding any portion of a character that lies below the baseline and disregarding any portion of a character that lies above the top line.

29. A method for reading the characters of a license plate character set on a license plate on a vehicle, the license plate having a state logo identify a state and having ambiguous characters in the license plate character set, comprising:
  producing an image including the license plate;
  producing and storing digital image data corresponding to the image;
  scanning the image data and identifying at least one block of the image data that meets predetermined criteria indicating that the block is possibly a license plate character set;
  extracting the individual characters from the license plate character set;
  recognizing and identifying each character of the license plate character set; and
  scanning the image data to recognize the state logo and identify the state of the license plate.

30. The method of claim 29 wherein the step of recognizing the state logo is performed after identifying at least one block of the image that meets predetermined criteria.

31. A method for reading the characters of a license plate character set on a license plate on a vehicle, the license plate having a state logo identifying a state and having ambiquous characters in the license plate character set, comprising:
  producing an image including the license plate;
  scanning the image and identifying at least one block of the image that meets predetermined criteria indicating that the block is possibly a license plate character set;
  extracting the individual characters from the license plate character set;
  recognizing and identifying each character of the license plate character set;
  recognizing the state logo and identifying the state of the license plate;
  determining the type style of the identified state's license plate; and
  analyzing the license plate character set to identify the ambiguous characters in the license plate character set base on the type of the identified state.

* * * * *

UNITED STATES PATENT AND TRADEMARK OFFICE
CERTIFICATE OF CORRECTION

PATENT NO. : 4,817,166

DATED : March 28, 1989

INVENTOR(S) : Rafael C. Gonzalez, et al.

It is certified that error appears in the above-identified patent and that said Letters Patent is hereby corrected as shown below:

Column 1, line 24 "identify" should be --identity--.
Column 5, line 20 "extension" should be --extraction--.

Column 11, line 2 after "predetermined" insert --criteria indicating that the block is possibly an image of the characters of the license plate; and said predetermined criteria being a pattern of intensity changes occurring at a predetermined--.
Column 12, line 35 after "scanning", delete "and" and insert --the--.
Column 12, line 68 after "time;" delete "the" and insert --that--.
Column 13, line 6 "provide" should be --province--.
Column 16, line 24 "identify" should be --identifying--
Column 16, line 47 "ambiquous" should be --ambiguous--.
Column 16, line 64 "base" should be --based--.

Signed and Sealed this

Nineteenth Day of December, 1989

*Attest:*

JEFFREY M. SAMUELS

*Attesting Officer*     *Acting Commissioner of Patents and Trademarks*